United States Patent Office 2,850,484
Patented Sept. 2, 1958

2,850,484

POLYMERS AND COPOLYMERS OF N-PYRIMIDYL AMIDES OF ALKENE-1,2-DIOIC ACIDS

Gaetano F. D'Alelio, Pittsburgh, Pa., assignor to Koppers Company, Inc., a corporation of Delaware No Drawing. Application June 26, 1953
Serial No. 364,508

15 Claims. (Cl. 260—78)

This invention relates to new monomers and to new polymeric materials derived therefrom and is particularly directed to the polymerization products obtained by polymerizing a mass comprising as a new monomer a pyrimidyl amide of an ethylenic alpha, beta-dicarboxylic acid hereinafter referred to as a polymerizable ethenedioic acid and a copolymerizable compound especially acrylonitrile. The invention also relates to compositions of these polymerization products adapted to the formation of shaped articles, in many cases to molecularly oriented shaped articles, particularly to fibers, threads, bristles, mono-filaments, etc., hereinafter referred to as fibers, and other shaped articles such as films and the like, which articles show improved dyeing properties.

It has been known for some time that certain copolymers of acrylonitrile may be adapted to the preparation of shaped articles, such as, films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C. or upon spinning from hot solutions. Such cross-linking causes spoliation of material by gelation during storage, embrittlement of fibers, fouling of spinning jets, and other production difficulties.

In accordance with the present invention it has now been found that crosslinking is avoided and that improvements in dyeing properties of acrylonitrile polymers are obtained by the polymerization of monomeric masses comprising acrylonitrile and N-pyrimidyl amide of a polymerizable ethenedioic acid with or without other copolymerizable ethylenic compounds. It has been found further that in addition to the fact that the N-pyrimidyl amides of polymerizable ethenedioic acids yield particularly valuble copolymers with acrylonitrile, they can also be used effectively to form copolymers with other types of copolymerizable ethylenic compounds having a $CH_2=C<$ group. Thus it has been found that valuable polymerization products may be prepared in accordance with the invention by polymerizing a monomeric mass comprising an N-pyrimidyl amide of a polymerizable ethenedioic acid and a polymerizable compound such as acrylonitrile and the other polymerizable ethylenic compounds listed hereinafter.

The amides of this invention are formed by reacting an amide-forming pyrimidine, that is, an aminopyrimidine having replaceable N-hydrogen with a polymerizable ethenedioic acid, or the anhyrides or acid chlorides of these acids. The readily polymerizable ethenedioic acids include maleic acid, fumaric acid, citraconic acid, and mesaconic acid. These acids may be represented by the formula

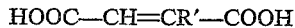

HOOC—CH=CR'—COOH in which R' is either hydrogen or the methyl radical. (The formulas herein are not intended to distinguish between cis and trans forms.) Since the ethenedioic acids are dibasic, one of the carboxyl groups can be esterified either before or after amidation. Another amide group similarly can be introduced either before or after the amidation. The amidation can also be carried to the diamide stage. When it is carried to the mono-stage only, the remaining carboxyl group can be esterified or amidated (with ammonia or another amine as desired).

For reasons of economy and ease of preparation the methyl or ethyl ester of N-(2,6-dimethyl-4-pyrimidyl) amide acid is usually preferred when an ester is used and has the formula

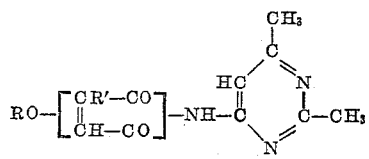

in which R is either the methyl or ethyl radical. These esters are prepared simply by refluxing methanol or ethanol with the proper ethenedioic anhydride to form the acid ester and the acid ester formed is then converted to the acid chloride by refluxing with thionyl chloride and the acid chloride formed is thereafter reacted with 4-amino-2,6-dimethyl pyrimidine to produce the desired ester, that is, the methyl or ethyl ester of N-(2,6-dimethyl-4-pyrimidyl) amide acid. The amide-acid itself is conveniently prepared by reacting the proper anhydride or the acid chloride with 4-amino-2,6-dimethyl pyrimidine. The acid chloride and anhydride are sufficiently reactive to form the above esters or amides merely upon the mixing at room temperature. In some cases where the acid chloride or anhydride is not as reactive or in order to get more complete reaction, gentle heating may be advantageous. As an alternate synthesis of the ester-amide, the amide acid can be readily converted to a sodium or potassium salt and esterified with dimethyl or diethyl sulfate to the corresponding ester.

The N-pyrimidyl amides of polymerizable ethenedioic acids are represented by the formula

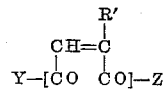

in which Y is the radical Z or the radicals RO— or $R_2N$— in which R is hydrogen or an alkyl, aryl, aralkyl, alkaryl, or cycloaliphatic group which can have halogen-, acyloxy-, or alkoxy-substituents or when Y is $R_2N$— the R's may be linked together to form with the nitrogen a heterocyclic group; R' is hydrogen or the methyl radical; and Z is the group

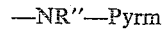

—NR''—Pyrm in which R'' is selected from the class consisting of hydrogen and alkyl groups, such as, methyl, ethyl, isopropyl, n-butyl, sec-butyl, amyl, hexyl, decyl, and the like, preferably containing not more than three carbon atoms and Pyrm is a pyrimidine nucleus. The pyrimidine nucleus can be substituted or unsubstituted as in the case of 4-amino-pyrimidine, 4-amino-2,6-dimethyl-pyrimidine, 4-amino-2,6-diethyl-5-methyl-pyrimidine and like amino pyrimidines. Other suitable pyrimidines and methods for their manufacture are given by Larchar, U. S. Patent 2,540,826, and Brown, J. Soc. Chem. Ind. 69, 353+ (1950). If substituted it is preferred that the substituents shall be alkyl groups as listed above, but preferably containing not more than a total of five carbon atoms.

When the amides used in the practice of the invention contain an ester group or an amide group other than group Z the radical R can be methyl, ethyl, propyl, isopropyl, n-butyl, sec-butyl, amyl, hexyl, decyl, chloromethyl, chloroethyl, cyclohexyl, methyl-cyclopentyl, propyl-cyclopentyl, amyl-cyclopentyl, methyl-cyclohexyl, dimethyl-cyclohexyl, chlorocyclohexyl, phenyl, chlorophenyl, xenyl, naphthyl, tolyl, chlorotolyl, xylyl, ethylphenyl, propyl-phenyl, isopropyl-phenyl, benzyl, chlorobenzyl, phenethyl, phenyl-propyl, phenyl-butyl, acetoxyethyl, chlorophenoxy-ethyl, acetoxy-propyl, acetoxy-isopropyl, acetoxy-phenyl, acetoxy-benzyl, acetoxy-tolyl, acetoxy-cyclohexyl, methoxy-propyl, ethoxy-propyl, methoxy-phenyl, methoxy-benzyl, methoxy-tolyl, methoxy-cyclohexyl, etc. or part of a heterocyclic amino group, such as, the piperidyl, piperazino and morpholino groups.

The proportions of the amide in the polymerization products of the invention can vary over a wide range, ranging from equimolar proportions of amide down to very small amounts of amide such as can be employed in acrylonitrile polymers to impart dye susceptibility thereto. Although even smaller amounts are somewhat effective, the improvement in susceptibility of acrylonitrile copolymers to dyes becomes particularly noticeable when the amide content of the copolymer is about 0.1 percent and the susceptibility increases as the amount of amide is increased. Ordinarily sufficient improvement in dye susceptibility is obtained with amounts of amide ranging up to about 10 or 15 percent but it may be advantageous for reasons such as in the preparation of ion-exchange polymers or additives to improve dyeing properties to have a larger proportion of amide in the acrylonitrile copolymer. In such cases the concentration of amide can range up to or approaching 50 mole percent. Within these proportions acrylonitrile copolymers of the invention show great affinity toward many dyes especially basic, acidic, vat, and cellulose acetate dyes.

In addition to the improvements effected in the resulting copolymers, the use of N-pyrimidyl amides of polymerizable ethenedioic acids has certain other advantages over the use of the corresponding acids. For example, the amides are more soluble in acrylonitrile than the acids. Therefore it is generally easier to get complete copolymerization of the amide with acrylonitrile in solution, emulsion and suspension polymerizations. Still further advantages accrue from the presence of these amides. Thus when non-esterified mono-amides are used the copolymers of the invention show high susceptibility to basic dyes.

The acylonitrile copolymers discussed herein are soluble in N,N-dimethyl acetamide (DMA), N,N-dimethyl formamide (DMF), butyrolactone, ethylene carbonate, N,N-dimethyl methyl urethane of the formula (CH$_3$)$_2$NCOOCH$_3$ ethylene carbamate, N-methyl-2-pyrrolidone, and a number of similar solvents, used alone or in conjunction with N,N-dimethyl cyanamide, N,N-dimethyl cyano-acetamide, N,N-dimethyl methoxy-acetamide, methylene dinitrile, methylene dithiocyanate, formyl caprolactam, formyl morpholine, tetramethylene sulfone, etc. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as, vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

*Example I*

24.4 grams (0.2 mol) 4-amino-2,6-dimethyl pyrimidine is admixed with approximately 150 ml. diethyl ether and there is added slowly and with stirring 19.6 grams (0.2 mol) maleic anhydride. The mixture is refluxed for approximately ½ hour, cooled and the ether evaporated. The residue is recrystallized from absolute ethanol. There is obtained N-(2,6-dimethyl-4-pyrimidyl) maleic acid mono-amide.

Ultimate analyses for carbon, hydrogen and nitrogen and molecular weight determinations on the product give results which are in close agreement with the theoretical values for N-(2,6-dimethyl-4-pyrimidyl) maleic acid mono-amide.

Substitution of equivalent quantities of polymerizable ethenedioic acid anhydrides or amino-pyrimidines, respectively, in the foregoing procedure for the maleic anhydride and 4-amino-2,6-dimethyl pyrimidine there used yields the various mono-pyrimidyl amides of the ethenedioic acids of this invention which are characterized by ultimate analyses and molecular weight determinations as in the foregoing procedure.

*Example II*

44.0 grams (0.2 mol) N-2,6-dimethyl-4-pyrimidyl) maleic acid monoamide (prepared as in Example I) is dissolved in a minimum amount of water and 8.0 grams (0.2 mol) sodium hydroxide added slowly to form the sodium salt. The water is evaporated and the residue is admixed with approximately 150 ml. diethyl ether. There is added slowly and with stirring 25.0 grams (0.2 mol) dimethyl sulfate. The ether is evaporated and the residue recrystallized from absolute ethanol. There is obtained the methyl ester of the mono-amide of the ethenedioic acid.

Ultimate analyses for carbon, hydrogen and nitrogen and molecular weight determinations on the product give results which are in close agreement with the theoretical values for the methyl ester of the pyrimidyl amide of the ethenedioic acid.

Substitution of the various mono-amides of Example I or diethyl sulfate respectively in the foregoing procedure for the N-(2,6-dimethyl-4-pyrimidyl)maleic acid mono-amide and dimethyl sulfate there used yields the various methyl and ethyl esters of the mono-amides of ethenedioic acids of this invention which are characterized by ultimate analyses and molecular weight determinations as in the foregoing procedure.

*Example III*

44.0 grams (0.2 mol) N-(2,6-dimethyl-4-pyrimidyl) maleic acid mono-amide is admixed with approximately 150 ml. diethyl ether and 29.7 grams (0.25 mol) thionyl chloride and the mixture refluxed for approximately ½ hour. The ether is evaporated and there is obtained the acid chloride.

This acid chloride is added slowly and with stirring to a mixture of 10.0 grams (0.2 mol) dimethyl amine and 150 ml. diethyl ether in a flask equipped with a reflux condenser. After the addition of the acid chloride the mixture is refluxed for approximately ½ hour and the ether is then evaporated. The residue is dissolved in water and shaken with 29.0 grams (0.125 mol) silver oxide to remove the chloride ion. The mixture is filtered and the filtrate evaporated to dryness. The residue is recrystallized from absolute ethanol. There is obtained N-dimethyl-N'-(2,6 - dimethyl - 4 - pyrimidyl)ethenedioic aicd diamide.

Ultimate analyses for carbon, hydrogen, and nitrogen and molecular weight determinations on the product give results which are in close agreement with the theoretical values for N-dimethyl-N'-(2,6-dimethyl-4-pyrimidyl)-ethenedioic acid diamide.

Substitution of equivalent quantities of the various mono-amides of Example I or dialkyl amines, respectively, in the foregoing procedure for N-(2,6-dimethyl-4-pyrimidyl) maleic acid mono-amide and dimethyl amine there used yields the various unsymmetrical diamides of this invention which are characterized by ultimate analyses and molecular weight determinations as in the foregoing procedure.

*Example IV*

47.7 grams (0.2 mol) of the acid chloride of Example III is added slowly and with stirring to a mixture of 24.4 grams (0.2 mol) 4-amino-2,6-dimethyl pyrimidine and 150 ml. diethyl ether in a flask equipped with a reflux condenser. After addition of the acid chloride, the mixture is refluxed for approximately ½ hour and the ether is then evaporated. The residue is dissolved in water and shaken with 29.0 grams (0.125 mol) silver oxide to remove the chloride ion. The mixture is filtered and the filtrate evaporated to dryness. The residue is recrystallized from absolute ethanol. There is obtained N,N'-(2,6-dimethyl-4-pyrimidyl) ethenedioic acid diamide.

Ultimate analyses for carbon, hydrogen and nitrogen and molecular weight determinations give results which are in close agreement with the theoretical values for N,N'-(2,6-dimethyl-4-pyrimidyl) ethenedioic acid diamide.

Substitution of equivalent quantities of the various acid chlorides obtained in Example III or various amino pyrimidines in the foregoing procedure for the particular acid chloride and amino pyrimidine there used yields the various diamides of ethenedioic acids of this invention which are characterized by ultimate analyses and molecular weight determinations as in the foregoing procedure.

*Example V*

Five polymers of acrylonitrile are prepared from the following monomer compositions

| Polymer | Acrylonitrile, parts | N-2,6-dimethyl-4-pyrimidyl) maleic amide-acid, parts |
|---|---|---|
| A | 100 | |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 750–1,000 parts of distilled water at 30–50° C. containing dissolved therein one part of ammonium persulfate, 0.6 to 1.5 parts of sodium bisulfite and 0.5 parts of sodium dodecyl-benzene sulfonate. The reaction is continued for 2–6 hours, at which time a yield of about 90 percent solid polymer is precipitated. The resulting polymers have molecular weights over 10,000. Each polymer is dissolved in N,N-dimethyl acetamide or butyrolactone and a film cast from each solution.

A water solution of methylene blue dye (a basic dye) is prepared by making a paste of the dye and then diluting to a one percent by weight dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film when treated in this manner showns only a light tint, whereas the mono-N-(2,6-dimethyl-4-pyrimidyl) maleic amide-acid copolymers are dyed a deep and dense shade. Identical films, cold-drawn and heat-treated, show dyeing characteristics similar to the undrawn films.

Fibers are spun from the same N,N-dimethyl acetamide or butyrolactone solutions either by dry spinning or by wet spinning, into glycerine baths. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films a light tint being acquired by the unmodified polyacrylonitrile fibers and a deep and dense color being given to the itaconate copolymer fibers.

Instead of N-(2,6-dimethyl-4-pyrimidyl) maleic amide-acid, the various N-(pyrimidyl) maleic amide-acids, disclosed above may be used. Also the N-(pyrimidyl) amide-acids of the other polymerizable ethenedioic acids may be used.

*Example VI*

Five polymers of acrylonitrile are prepared from the following monomer compositions

| Polymer | Acrylonitrile, parts | Methyl ester of N-(2,6-dimethyl-4-pyrimidyl) maleic amide-acid, parts |
|---|---|---|
| A | 100 | |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 0.5 to 1 part sodium dodecyl benzene sulfonate, 1.0 parts of ammonium persulfate, 0.5 part of sodium bisulfite, and 100 parts of monomer or monomer mixture. The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer is dissolved in dimethyl formamide or butyrolactone and a film cast from the solution. The film is washed entirely free of solvent and stretched at a ratio of about 8:1 in a glycerine bath at 135 to 145° C. The film is then washed in water and dyed in a bath containing for each part of film 0.05 part of 1,5 - diamino-4,8-dihydroxy-anthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile when treated in this manner has little or no color, all of the copolymers are dyed to a deeper blue shade.

Fibers are spun from the same solutions either by dry spinning, or by wet spinning. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, tetramethyl urea, butyrolactone, ethylene carbonate, formyl morpholine, etc.

Instead of the monomethyl ester amide of the above example, various other esters of N-(2,6-dimethyl-4-pyrimidyl) maleic amide-acid can be used, such as the ethyl, propyl, isopropyl, butyl, isobutyl, tertiary-butyl, hexyl, tolyl, phenyl, naphthyl, cyclopentyl, cyclohexyl, benzyl, phenethyl, etc. esters. Likewise the esters of the other N-(pyrimidyl) maleic amide-acids disclosed above can be used.

*Example VII*

Five parts of the copolymer fiber D of Example V is dyed to a deep green shade using the vat color dimethoxy-dibenzanthrone at 70° C. in a bath containing 0.5 part of dye, 0.25 part sodium hydroxide, 0.5 part sodium hydrosulfite and 100 parts of water (20:1 bath-fiber ratio). After the first 15 minutes of heating, 0.25 part of Glauber's salt is added. The fiber sample is then oxidized in a 0.5 percent sodium dichromate 1.0 percent acetic acid aqueous solution at 70° C. for 30 minutes in a 20:1 bath-fiber ratio. The dyed fiber is then scoured in a 0.5 percent boiling soap solution. A sample of yarn prepared from the unmodified polyacrylonitrile and dyed under the same conditions acquired only a light shade of color.

When 1,5 - di - p - anisoylamino - 4,8 - dihydroxyanthraquinone is used as the vat dye, the copolymer fiber is dyed a strong violet color.

*Example VIII*

The procedure of Example V is repeated for the polymerization of the following monomer compositions

| Polymer | Acrylonitrile, parts | Vinyl Chloride, parts | Methyl ester of N-(2,6-dimethyl-4-pyrimidyl) maleic amide-acid, parts | Copolymer Soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | $NO_2Me$. |
| E | 57 | 40 | 3 | $NO_2Me$. |
| F | 37 | 60 | 3 | Acetone. |

Sometimes copolymers D and E, when dissolved in nitromethane may have gelled, partially dissolved particles known as fisheyes. In such cases, the solubility can be improved by the addition of small amounts of materials which are good solvents for acrylonitrile polymers, such as butyrolactone, ethylene carbonate, dimethyl formamide, dimethyl acetamide, tetramethyl urea, etc. In addition, certain materials which are relatively poor solvents for polyacrylonitrile, such as diethyl formamide, diethyl acetamide, diethyl propionamide, etc., can be added to improve the solubility. Also, when acetone solutions of copolymer F contain gelled particles, clarification of the solution can be effected by the addition of nitromethane, diethyl formamide, diethyl acetamide, etc.

Dyeing tests of these copolymers show improvements in dyeing susceptibility similar to those of Example V.

The procedure of this example can also be used with the various other amide-esters set forth above.

*Example IX*

The procedure of Example V is repeated for the polymerization of the following monomer compositions

| Polymer | Acrylonitrile, parts | Styrene, parts | Methyl ester of N-(2,6-dimethyl-4-pyrimidyl) maleic amide-acid, parts |
|---|---|---|---|
| A | 88 | 7 | 5.0 |
| B | 78 | 17 | 5.0 |
| C | 68 | 27 | 5.0 |
| D | 58 | 37 | 5.0 |

Dyeing tests of these copolymers show improvements in dye susceptibility similar to Example V. In place of styrene, various styrene derivatives can be used, such as alpha-methyl-styrene; nuclear-substituted chloro-styrenes, i. e., ortho-, meta-, and para-chloro-styrenes, dichloro-styrenes; for example, the 2,3-, 2,4-, 2,5-, 2,6-, 3,4-, and 3,5-dichloro-styrenes; trichloro-styrenes; cyano-styrenes, such as ortho-, meta-, and para-cyano-styrenes, dicyano-styrenes, nuclear-substituted alkyl-styrenes, such as mono- and di-methyl-styrenes, mono- and di-ethyl-styrenes, mono- and di-isopropyl-styrenes, aryl-substituted styrenes, i. e., para-phenyl-styrene, etc.; cycloaliphatic-substituted styrenes, such as para-cyclohexyl-styrene; fluoro-styrenes, such as ortho-, meta-, para-fluoro-styrene, difluoro-styrenes, etc.; trifluoro-methyl-styrenes, such as ortho-, meta-, and para-trifluoromethyl-styrenes, di-(trifluoromethyl)-styrenes, and various other styrenes or mixtures of any number of these with each other or with styrene.

The procedure of this example can also be used with the various other amide-esters set forth above.

*Example X*

The procedure of Example V is repeated for the polymerization of the following monomer compositions

| Polymer | Acrylonitrile, parts | Vinylidene Chloride, parts | Methyl ester of N-(2,6-diethyl-5-methyl-4-pyrimidyl) maleic amide-acid, parts | Copolymer Soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of at least 85 percent in the polymer molecules, only the more active solvents, such as butyrolactone, ethylene carbonate, N,N-dimethyl acetamide, N,N-dimethyl formamide, N,N,N',N'-tetramethyl urea, etc., can be used as solvents. The above copolymers dye more readily and thoroughly than similar copolymers containing no N-(pyrimidyl) maleic acid amide.

The procedure of this example can also be used with the various other amide-esters set forth above.

*Example XI*

The procedure of Example V is repeated for the polymerization of the following monomer compositions

| Polymer | Acrylonitrile, parts | Vinylidene Chloride, parts | Vinyl Chloride, parts | Ethyl ester of N-(2,6-dimethyl-4-pyrimidyl) maleic amide-acid, parts |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example V.

The procedure of this example can also be used with the various other amide-esters set forth above.

*Example XII*

Instead of copolymerizing the maleic acid amides with the acrylonitrile, copolymers of the maleic amide, such as polymers D and E of Example VI can be used as modifiers for the unmodified homopolymers and copolymers of acrylonitrile. For example, polymer E of Example VI, which consists of 80 parts of acrylonitrile and 20 parts of methyl ester of N-(2,6-dimethyl-4-pyrimidyl) maleic amide-acid, has excellent compatibility with homopolymers of acrylonitrile. In many cases, it is desirable to use the copolymers of the N-pyrimidyl maleic acid amides, which have even a higher ratio of the maleic acid amide, as for example, as high as equal molar ratios of the maleic acid amide copolymerized with acrylonitrile or methacrylonitrile. Suitably from about 10 to 15 to about 70 percent of amide can be used. The overall amounts of amide required to improve the dyeability generally corresponds to the amounts indicated above for copolymers in which the main body of the acrylonitrile polymers contain the amide copolymerized directly therein, that is, for at least about 0.1 percent to advantageously 5 percent or even up to 15 percent amide in the ultimate polymer mixture. The copolymers of maleic amides with other monomers are also satisfactory such as, for example, copolymers of styrene, methyl acrylate, ethyl methacrylate, alpha-methyl-styrene, etc., and these copolymers can be prepared substantially in accordance with the procedure of Example V. A solution of these copolymers is prepared in dimethyl formamide and added to a dimethyl formamide solution of polyacrylonitrile, so that a composition containing 90 parts combined acrylonitrile and other monomer units and about 10 parts of the amide units is obtained. The solution as heated to 130° C. after which the solution is filtered. Films and fibers prepared from this mixture are dyed in accordance with the process of Example VII and satisfactorily dyed, shaped articles are obtained. The unmodified polyacrylonitrile without the addition of these maleic acid amides showed little or no dye retention.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing at least one structural unit present in the acrylonitrile copolymer. Thus as there are present in the acrylonitrile copolymer, structural units derived from the acrylonitrile and styrene, it is desirable to have present in the modifying copolymer structural units derived from styrene and/or acrylonitrile, advantageously both, in addition to those derived from the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The di-N-pyrimidyl maleic amides of the structure

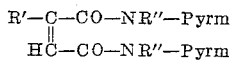

in which R', R", and Pyrm are as described above can be used instead of the mono amide in the practice of this invention.

The polymerization products of the present invention have in the polymer molecule a plurality of repeating units of the formula

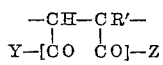

in which Y, Z, and R', are as indicated above and will contain additional repeating units of the formula

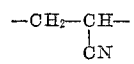

when the amide is copolymerized with acrylonitrile.

In addition, the copolymers can contain any number of repeating units of the type obtained by the copolymerization of the amides of the invention or a mixture of acrylonitrile and the amide with one or more copolymerizable ethylenic compounds, such as, for example, vinylidene chloride, vinyl chloride, styrene, alpha-methylstyrene and methacrylonitrile. When the polymerization mass contain, in addition to the pyrimidyl maleic amides, a polymerizable monomer having a $CH_2=C<$ group in an amount such that the latter monomer is present to an extent of at least 50 mol percent of the overall monomer content, then monomers such as fumaronitrile, beta-cyano-acrylamide and methyl beta-cyano-acrylate can also be present in the polymerization mixture.

As previously indicated, the solvent resistance of such copolymers as contain one or more monomer units in addition to those formed by the acrylonitrile and the amides of the invention is affected by the type and proportion of copolymerizing monomer or monomers used to replace part of the acrylonitrile. For example, copolymers containing small amounts of the amide units can contain various proportions of such monomer units as obtained from vinylidene chloride, methacrylonitrile, fumaronitrile, and beta-cyanoacrylamide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-amide type copolymer will decrease much more when a monomer having relatively weak secondary bonding forces, such as styrene or ethylene is used to replace part of the acrylonitrile than when one or more monomers having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which can also be present in the polymerizable masses for copolymerization with the amides used in the practice of this invention include one or more of the following: acrylates, e. g. methyl acrylate; methacrylates, e. g. methyl methacrylate; acrylamides; methacrylamides; vinyl esters, such as vinyl acetate; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes and the nuclear-substituted styrenes listed in Example IX, etc.

The polymerization products of this invention can be prepared by various polymerization systems, such as emulsion, suspension, mass and solution polymerizations. In addition to the monomers, the polymerizable mass can also contain other materials such as catalysts, e. g. peroxides, such as benzoyl peroxide, naphthyl peroxides, phthalyl peroxide, tertiarybutyl hydro-peroxide, hydrogen peroxide, cyclohexyl hydroperoxide, tertiarybutyl perbenzoate, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., can be used as a precipitating bath for N,N-dimethyl acetamide, N,N,N',N'-tetramethyl urea, butyrolactone, ethylene carbonate, and other solvent compositions of these copolymers. The extruded fibers, from which substantially all of the solvent has been removed in the spinning step, about 1–10 percent remaining in the shaped article, can then be cold-drawn about 100–900 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent of amide in the copolymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and an amide according to the invention, the proportion of acrylonitrile in the copolymers can be much less than 85 percent without destroying the capacity for molecular orientation. Molecularly oriented, cold-drawn, shaped articles of particular usefulness are prepared from copolymer compositions containing in the polymer molecules 60–99.9 percent acrylonitrile, 0.1–15 percent, advantageously 0.1–5 percent, the amide, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of the monomers of this class being noticeable when the monomer is present in the polymer molecule in amounts of one percent or more.

The polymerization products of this invention show great affinity for the acetate, basic, acidic and vat dyes.

The cellulose acetate dyes which are effective with these polymerization products are mainly amino-anthraquinone derivatives. The basic dyestuffs toward which these polymerization products show great affinity are preferably those which contain amide, alkylamido, or ammonium groups, such as $-NH_2$, $-N(CH_3)_2$, $-N(C_2H_5)_2$, $-NHC_6H_5$, $-N(CH_3)_3OH$, etc. and which may also be used in the form of their salts, i. e. the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these polymerization products are mainly amino-anthraquinone derivatives, basic azo compounds and other basic substances, such as the Duranol, Dispersol, Sericol, etc. dyestuffs. A number of other acidic dyes that can be used are anthranilic acid→1-(4'sulfophenyl), 3-methyl-5-pyrazolone; 1,5-diamino-4, 8-dihydroxyanthraquinone - 3 - sulfonic acid; 1-amino-naphthalene-4-sulfonic acid→alpha-naphthol-4-sulfonic acid; the sodium salt of sulfanilic acid→aniline→2-benzoyl-amino-5-naphthol-7-sulfonic acid; the sodium salt of 4,4'-diaminostilbene-2,2'-di-sulfonic acid ⇌ (phenol)$_2$ ethylated; 1,5-diamino-4,8-dihydroxyanthraquinone-3-sulfonic acid; dye prepared by diazotizing 1-aminonaphthalene-4-sulfonic acid and coupled with alpha-naphthol-4-sulfonic acid; the sodium salt of (n-aminobenzoic acid→o-anisidene) phosgenated; the sodium salt of (2-naphthol-6,8-disulfonic acid←benzidine→phenol) ethylated; dimethoxy-dibenzanthrone; and 1,5-di-p-anisoylamino-4,8-dihydroxy-anthraquinone.

From the molecularly orientable copolymers of this invention fibers can be prepared having improved dyeing properties, low shrinkage in boiling water, sometimes as low as 3 to 5 percent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

This application is a continuation in part of application Serial No. 244,700 filed August 31, 1951 now abandoned.

What is claimed is:

1. As a new monomeric composition N-(2,6-dimethyl-4-pyrimidyl) maleamic acid.

2. A copolymer a polymerizable monomer having $CH_2=CH<$ group and N-(2,6-dimethyl-4-pyrimidyl) maleamic acid.

3. A copolymer acrylonitrile and N-(2,6-dimethyl-4-pyrimidyl) maleamic acid.

4. A cold-drawn fiber having molecular orientation and dye susceptibility to acid dyes, said fiber comprising a copolymer of acrylonitrile and a member selected from the group consisting of the methyl and ethyl esters of N-(2,6-dimethyl-4-pyrimidyl) maleamic acid, said copolymer having a molecular weight of at least about 10,000 and containing in the polymer molecule no more than about 15% by weight of said amide.

5. A cold-drawn fiber having molecular orientation and dye susceptibility of acid dyes, said fiber comprising a copolymer of about 60–98.9 percent by weight acrylonitrile, about 0.1 to 5 percent by weight of a member selected from the group consisting of the methyl and ethyl esters of N-(2,6-dimethyl-4-pyrimidyl) maleamic acid, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl beta-cyano-acrylate.

6. A cold-drawn fiber having molecular orientation and dye susceptibility to acid dyes, said fiber comprising a copolymer of about 60–98.9 percent by weight acrylonitrile, about 0.1 to 5 percent by weight of a member selected from the group consisting of the methyl and ethyl esters of N-(2,6-dimethyl-4-pyrimidyl) maleamic acid and about 1 to 39.9 percent by weight vinylidene chloride.

7. A cold-drawn fiber having molecular orientation and dye susceptibility to acid dyes, said fiber comprising a copolymer of about 60–98.9 percent by weight acrylonitrile, about 0.1 to 5 percent by weight of a member selected from the group consisting of the methyl and ethyl esters of N-(2,6-dimethyl-4-pyrimidyl) maleamic acid and about 1 to 39.9 percent by weight vinyl chloride.

8. A cold-drawn fiber having molecular orientation and dye susceptibility to acid dyes, said fiber comprising a copolymer of about 60–98.9 percent by weight acrylonitrile, about 0.1 to 5 percent by weight of a member selected from the group consisting of the methyl and ethyl esters of N-(2,6-dimethyl-4-pyrimidyl) maleamic acid and about 1 to 39.9 percent by weight styrene.

9. Monomers of the general formula:

ROOCCH=CR'—CONH—Pyrm wherein R is a member selected from the group consisting of hydrogen, methyl and ethyl, R' is a member selected from the group consisting of hydrogen and methyl, and Pyrm is a member selected from the group consisting of 4-amino pyrimidine, 4-amino-di- lower alkyl pyrimidine and 4-amino-tri- lower alkyl pyrimidine radicals.

10. N-(2,6-dimethyl-4-pyrimidyl) maleamic acid.
11. Methyl-N-(2,6-dimethyl-4-pyrimidyl) maleamate.
12. Ethyl N-(2,6-dimethyl-4-pyrimidyl) maleamate.
13. The homopolymer of the monomeric material of claim 9.
14. A copolymer of the monomeric material of claim 9 and acrylonitrile.
15. A polymeric material comprising the copolymer of claim 14 and a member selected from the group consisting of vinyl chloride, vinylidene chloride, styrene, alpha-methyl-styrene, methacrylonitrile, fumaronitrile, beta-cyano-acrylamide, and methyl beta-cyano-acrylate.

References Cited in the file of this patent

UNITED STATES PATENTS

| | | |
|---|---|---|
| 2,643,990 | Ham | June 30, 1953 |
| 2,687,400 | D'Alelio | Aug. 24, 1954 |
| 2,687,401 | D'Alelio | Aug. 24, 1954 |
| 2,759,908 | D'Alelio | Aug. 21, 1956 |